No. 662,309. Patented Nov. 20, 1900.
A. N. RUSSELL.
CORN HARVESTER.
(Application filed Mar. 16, 1900.)
(No Model.) 3 Sheets—Sheet 1.
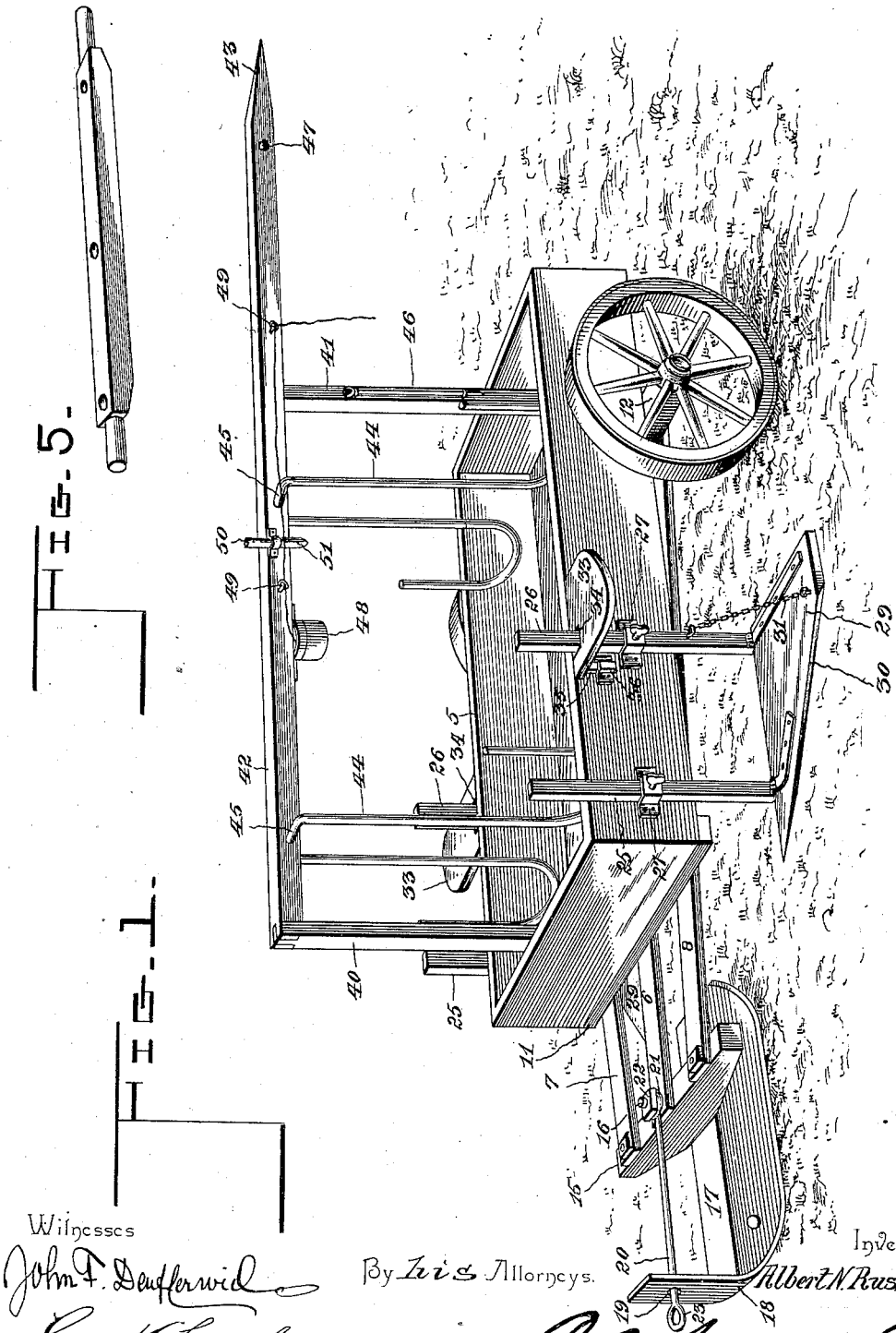
Witnesses
Inventor
Albert N. Russell,
By his Attorneys,
C. A. Snow & Co.

No. 662,309. Patented Nov. 20, 1900.
A. N. RUSSELL.
CORN HARVESTER.
(Application filed Mar. 16, 1900.)
(No Model.) 3 Sheets—Sheet 2.
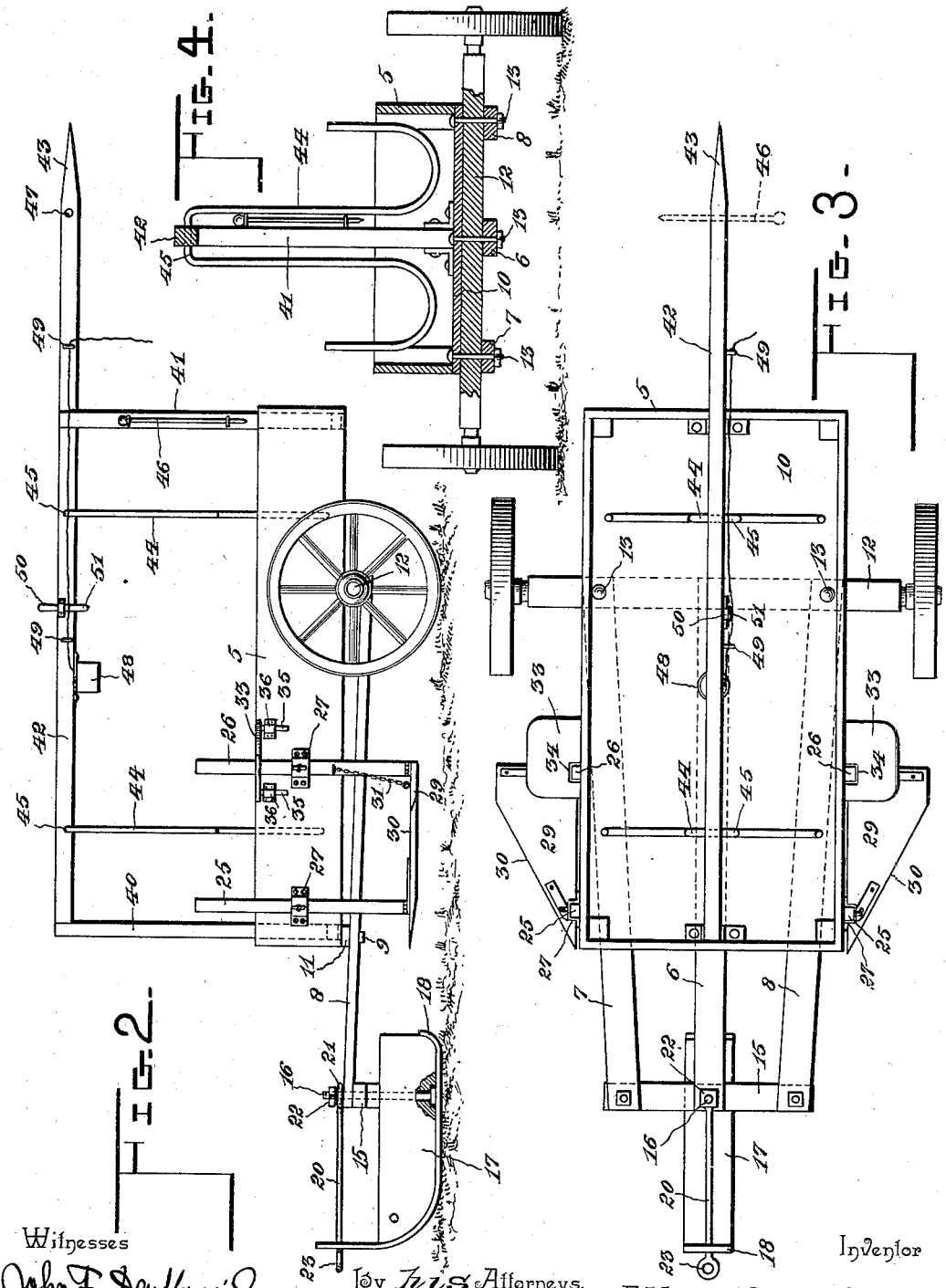
Witnesses
Inventor
Albert N. Russell,

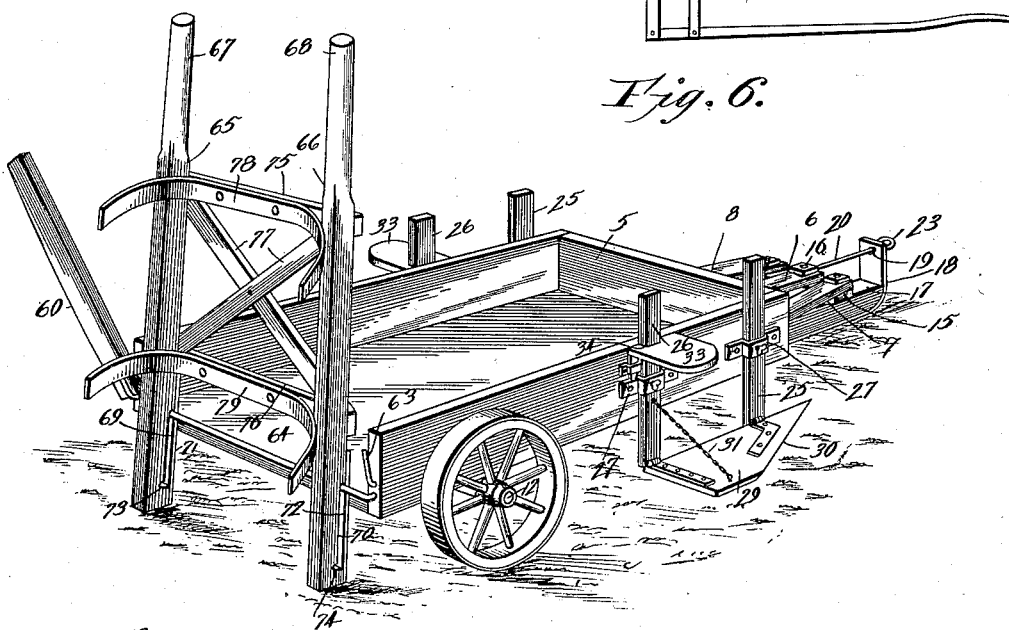

UNITED STATES PATENT OFFICE.

ALBERT NELSON RUSSELL, OF CHERRYVALE, KANSAS.

CORN-HARVESTER.

SPECIFICATION forming part of Letters Patent No. 662,309, dated November 20, 1900.

Application filed March 16, 1900. Serial No. 8,918. (No model.)

*To all whom it may concern:*

Be it known that I, ALBERT NELSON RUSSELL, a citizen of the United States, residing at Cherryvale, in the county of Montgomery and State of Kansas, have invented a new and useful Corn-Harvester, of which the following is a specification.

This invention relates to corn-harvesters in general, and more particularly to that class in which the standing corn is cut by the engagement of knives carried by a suitable vehicle, and which corn is manually collected in suitable shock-holders until a sufficient quantity has been cut, after which the vehicle is stopped and the shock is manually tied.

The object of the invention is to provide a construction in which the vehicle portion may have the harvesting and shocking mechanisms removed therefrom and may be supplied with a shorter axle to adapt it to the ordinary uses of the farm, and in which, moreover, the cutting mechanism may be adjustably secured and may be efficient in its operation.

In the drawings forming a portion of this specification, and in which similar numerals of reference designate corresponding parts in the several views, Figure 1 is a perspective view showing the apparatus in condition for harvesting corn. Fig. 2 is a side elevation with the runner partly in section and showing connections of the parts. Fig. 3 is a plan view of Fig. 2. Fig. 4 is a section taken vertically through the rear axle and looking rearwardly of the machine, the extremities of the axle and the rear wheels being in elevation. Fig. 5 is a perspective view of the interchangeable short axle. Fig. 6 is a perspective view showing a modification of the invention, including a different form of shocker. Fig. 7 is a plan view of Fig. 6 with the shocker in its reclining position. Fig. 8 is a plan view showing a tongue adapted for attachment to the runner of the apparatus. Fig. 9 is a plan view showing shafts which may be attached to the runner.
Referring now to the drawings, the harvester comprises a body portion 5, which is in the form of the usual farm-wagon body and to the under side of which and extending centrally and longitudinally thereof and projecting from the forward end is a central reach 6, outer reaches 7 and 8 being arranged at opposite sides of the reach 6 and converging forwardly and terminating beyond the front of the body on a line with the forward end of the central reach. These reaches are secured to the forward end of the body through the medium of bolts 9, passed through the bottom 10 of the body and through the transverse sill 11 upon the under side of the floor and intermediate it and the reaches. The bolts 9 are removably held in place by means of nuts in the usual manner.

Intermediate the rear ends of the reaches and the floor of the body 5 is disposed a rear axle 12, which is held in position by means of bolts 13 passed through the floor of the body 5 and through the axle and the rear ends of the corresponding reaches, the bolts being held in position by nuts, whereby the reaches may be readily removed from the body, and the rear axle may be removed for the substitution of an axle of different length for use under different conditions.

The forward ends of the reaches 6, 7, and 8 are bolted to a common bolster 15, the bolt connection of the reach 6, which is shown at 16, forming the king-bolt for a runner 17, through which the bolt is passed upwardly, the head of the bolt lying between the lower face of the runner and the shoe 18 thereof. This shoe 18 is continued upwardly around and beyond the curved front end of the runner and has a perforation 19 in its upwardly-projected portion, through which is passed a draft-rod 20, the rear end of which is provided with an eye 21, disposed upon the king-bolt and lying between the reach 6 and the bolt-securing nut 22. The outer end of the rod 20 is also provided with an eye 23, adapted for the attachment of a suitable draft appliance, and thus may the runner be turned upon the king-bolt to guide the vehicle as it is moved from place to place.

Adjustably connected with opposite sides of the body 5 and upon the outer faces thereof are parallel uprights 25 and 26, which are adjustably and removably held by means of U-shaped brackets 27, the outwardly-directed ends of which are bolted to the body. In the webs of the brackets are formed threaded perforations, with which are engaged clamping-screws adapted to impinge the uprights to hold them at different elevations.

Hinged to the lower ends of the uprights 25 and 26 at each side of the body is a triangular plate 29, of which the apex projects in the direction of movement of the vehicle, and one side lies parallel with the side of the vehicle. Thus the outer sides or edges of the plates are disposed to mutually converge, and as the vehicle is moved the outer edges of the plates have a sliding movement laterally of the standing corn as the latter is forced outwardly by the wedge action of the plates. In the drawings the plates are shown as having their outermost acute angles removed on lines parallel with the inner edges of the plates, so that while the cutting converging edges of the plates lie at angles to the inner edges said plates are not strictly triangular. Moreover, while the forward and outer cutting edges 30 are shown as formed integral they are not necessarily so. To limit the downward swinging movement of the plates 29, flexible connections in the form of chains 31 are connected with the outer portions of the upper faces of the plates and with adjacent uprights, thus at the same time permitting upward folding of the plates. A seat 33 at each side of the body has a recess 34 in its inner edge, through which the adjacent upright 26 is passed, said seat being removably supported in any desired manner, such as by means of pins or fingers 35 or brackets engaging clips 36, fastened to the body.

The interior of the body is equipped with mechanism in accordance with the construction shown in Patent No. 513,734, granted to me and dated January 30, 1894, and consists of uprights 40 and 41, disposed centrally at opposite ends of the body and having a connecting-beam 42, the rear end of which projects rearwardly of the body and has a sharpened end 43. U-shaped hangers 44 have their webs 45 engaging perforations in the beam 42, the legs of said hangers being extended downwardly and having their ends bent outwardly and upwardly, as shown. A shock-rest, consisting of a bar 46, is normally carried by the upright 41, and when in operative position is passed through a transverse perforation 47, adjacent the rear end of the beam 42. A twine-holder 48 is fixed to the under side of the beam, and the twine is passed through guides 49, carried by the beam and of which one is in the rear of the upright 41. A knife 50 is also carried in a sheath 51, fixed to the beam 42 and in a position to be readily grasped by the operator.

In the operation of the apparatus for harvesting corn the hook of a doubletree is engaged with an eye 23 at the end of the rod 20, the doubletree being of any preferred construction. After the team is hitched the harvester is drawn to cause engagement of the cutting edges of the knives with the standing corn, which will act to cut the cornstalks off at a height from the ground depending upon the adjustment of the plates 29. If a long stubble is desired, the set-screws are loosened and the uprights 25 and 26 are raised through the guide-plates 27 until the knives or plates are at the proper elevation, after which the set-screws are operated to clamp the uprights and hold the plates in fixed position. If a short stubble is to be left, the uprights are moved downwardly through the guide-plates to the proper extent and are then clamped by means of the set-screws. The operators stand on the plates at opposite sides of the body portion of the apparatus and collect the cut stalks and place them in the hangers at each side of the beam, and when a sufficient quantity of corn has been collected the apparatus is stopped. The rest-bar 46 is then passed horizontally through the perforation 47, as shown in dotted lines in Fig. 3, and the corn is lifted from the hangers and is stood on end and is rested in the angles of the beam and rest-bar and on both sides of the beam and rest-bar. The twine is then passed around the corn and after being drawn tightly is tied and cut. The bar 46 is then withdrawn and the harvester is moved on, when the beam will be drawn from the shock, as will be readily understood.

In place of the beam and the hangers there may be employed a different form of device for receiving the cornstalks, as shown in Figs. 6 and 7 of the drawings. In this event the fixed tail-board of the wagon is removed and in place thereof there is employed a tail-board 60, one end of which is secured to the laterally-turned end of a shaft 61, mounted in bearings upon the outer face of one side of the wagon-body, this shaft having an operating-handle 62, through the medium of which the shaft may be oscillated to pivotally move the tail-board into and out of its operative position. When the tail-board is in its operative position, it rests with its free edge behind a guide 63 in the rear end of the side of the wagon opposite to the shaft 61. The tail-board 60 is separated at its lower edge from the bottom of the wagon-body by an interspace, and across this interspace is disposed a bar 64, having its ends engaged with the ends of the sides of the wagon-body.

The receiver for the cornstalks comprises two beams 65 and 66, having handles 67 and 68 formed at one end, while longitudinal recesses 69 and 70 are formed in the under faces of the beams at their opposite ends. The bar 64 is disposed in these recesses 69 and 70, and over the recesses are secured plates 71 and 72, which act to hold the bar from displacement from the recesses. At the outer end of each of the recesses or guideways thus formed are seats 73 and 74. With this construction it will be seen that when the beams 65 and 66 are drawn forwardly to rest with their handle ends upon the front board of the wagon-body, as shown in Fig. 7, the seats 73 and 74 will receive the bar 64, and the beams will thus be held against longitudinal displacement. Cross-pieces 75 and 76 are attached to the under sides of the beams and adjacent the ends thereof, respectively, to hold them spaced, and braces 77 are connected with the beams diagonally. Upon the cross-pieces 75 and 76 are secured bows 78 and 79, which are substantially semi-elliptical and which lie parallel, with their outer ends disposed outwardly and at right-angles to the cross-pieces. In the employment of this form of the invention the stalk-receiver is moved to lie in the position shown in Fig. 7 to engage the bar 64 with the seats 73 and 74, and the tail-board 60 is moved to close the rear end of the wagon-body, at which time it rests with its lower edge upon the beams and at right angles thereto. The harvester is then operated in the same manner as above described to cut the corn, the stalks being thrown upon the receiver to lie in the bows thereof and with their butt-ends against the tail-board. A twine is then drawn from the twine-box on the front of the body and through the eye thereabove, and is then drawn to lie transversely of the receiver. When the receiver is full, the twine is tied around the shock, the tail-board is raised, and the handle ends of the beams are lifted. As the handles of the beams are lifted the receiver moves upon the bar 64 as a pivot until it has assumed a substantially vertical position, when further movement engages the lower ends of the beams with the rear end of the bottom of the wagon-body, and as the movement of the receiver is continued the beams are forced outwardly and the bar 64 moves from the seats 73 and 74. The carrier then drops to the position shown in Fig. 6 and the butts of the stalks are forced into the ground. The receiver may then be returned to its former position, and the harvester may be operated until the receiver is again full.

When it is desired to omit the harvesting and shocking portions of the apparatus, they may be readily removed, and if it then be desired to employ the vehicle about the farm the long axle is detached and the shorter axle (shown in Fig. 5) is substituted therefor to bring the wheels closer to the body. The longer axle, as will be readily understood, is designed to hold the wheels in positions to escape the stubble during the harvesting operation.

It will of course be understood that in practice various other modifications may be made and that any suitable materials and proportions may be used for the various parts without departing from the spirit of the invention.

When the corn-harvesting apparatus is removed for permitting the use of the device as a wagon, either a tongue or shafts may be connected with the runner. A tongue is shown in Fig. 8 of the drawings, and in adjusting this tongue to the runner the plates 55 are brought to lie at opposite sides of the runner and are held in place by means of a pin passed through perforations in the plates and through an alining perforation, shown as formed in the runner. In Fig. 9 is shown a pair of shafts which are connected at their rear ends by cross-pieces 56 and 57, to which are attached parallel beams 58, which are separated by an interspace to receive the runner. A pin is passed through these beams and through the perforation of the runner.

Having thus described the invention, what is claimed is—

1. The combination with a vehicle, of a runner pivotally connected therewith through the medium of a king-bolt, a shoe for the runner and projecting thereabove, and a draft-rod connected with the king-bolt and the projecting portion of the shoe.

2. The combination with a vehicle, of a runner pivotally connected therewith through the medium of a king-bolt, a shoe fixed to the runner and projecting thereabove, said projecting portion having a perforation therein, and a draft-rod passed through said perforation and connected with the king-bolt.

3. The combination with a vehicle, of a runner, a king-bolt passed upwardly through the runner and connected with the vehicle, the head of said bolt lying in a recess in the runner, a shoe upon the runner and projecting thereabove, a perforation in the projecting portion of the shoe, and a draft-rod passed through said perforation and connected with the king-bolt.

4. A vehicle comprising a body portion, a plurality of reaches removably connected with the body, and projecting therebeyond, a bolster connected with the projecting portions of the reaches, a runner connected with the bolster through the medium of a king-bolt, a shoe for the runner and projecting thereabove, a draft-rod connected with the king-bolt, and engaged with the projecting portion of the shoe.

5. A vehicle comprising a body having a plurality of reaches removably connected therewith, rear axles adapted for interchangeable connection intermediate the body and the reaches, a common bolster for the reaches in advance of the body, a runner, a king-bolt pivotally connecting the runner and bolster a shoe for the runner projecting above the forward end of the runner, a draft-rod passed through the projecting end of the runner and cutting-blades removably connected with the vehicle.

6. In a shocker for corn-harvesters, the combination with a body portion having a transverse rod, of a frame having guideways receiving the rod, seats in the guideways to engage the rod and hold the frame from slidable movement, and means for holding the corn upon the frame.

7. In a device of the class described, the combination with a body portion having a transverse rod, of beams having longitudinal slots receiving the rods, and seats for engagement with the rod to hold the frame from slidable movement, said frame being pivotally movable upon the rod to engage the body, and move the seats from engagement with the rod to permit sliding of the frame.

In testimony that I claim the foregoing as my own I have hereto affixed my signature in the presence of two witnesses.

ALBERT NELSON RUSSELL.

Witnesses:
  CORA MANDEVILLE,
  ROSA BEDFORD.